US007543044B2

United States Patent
Yen et al.

(10) Patent No.: US 7,543,044 B2
(45) Date of Patent: Jun. 2, 2009

(54) AUTOMATIC CONFIGURATION SYSTEM

(75) Inventors: Ming-Chou Yen, Hsin Chu (TW);
Chun-Wang Wei, Hsin Chu (TW);
Kun-Ying Tsai, Hsing Chu (TW)

(73) Assignee: RDC Semiconductor Co., Ltd., Hsin Chu (TW)

( * ) Notice: Subject to any disclaimer, the term of this patent is extended or adjusted under 35 U.S.C. 154(b) by 568 days.

(21) Appl. No.: 11/430,643

(22) Filed: May 9, 2006

(65) Prior Publication Data
US 2007/0117431 A1    May 24, 2007

(30) Foreign Application Priority Data
Nov. 21, 2005    (TW) .............................. 94140759 A

(51) Int. Cl.
*G06F 15/177*    (2006.01)
(52) U.S. Cl. .......................... 709/220; 370/254; 714/43
(58) Field of Classification Search .................. 439/171
See application file for complete search history.

(56) References Cited

U.S. PATENT DOCUMENTS 5,577,023 A * 11/1996 Marum et al. ............... 370/225
6,175,865 B1 * 1/2001 Dove et al. ................... 709/220
6,661,805 B1 * 12/2003 Romano et al. ............. 370/450
6,684,347 B1 * 1/2004 Coffey .......................... 714/43
7,039,711 B2 * 5/2006 Hsu et al. ..................... 709/228
7,242,210 B2 * 7/2007 Koizumi ....................... 324/765
7,292,596 B1 * 11/2007 Campana et al. ............ 370/419
7,451,356 B2 * 11/2008 Yen et al. ....................... 714/43

* cited by examiner

*Primary Examiner*—Brian T Pendleton
*Assistant Examiner*—Dung Huynh
(74) *Attorney, Agent, or Firm*—Sawyer Law Group, P.C.

(57) ABSTRACT

An automatic configuration system for automatically configuring a connecting interface of a node device in a network is provided. The connecting interface of the node device includes a first pair of connectors and a second pair of connectors. The automatic configuration system includes a switching unit, a first analog circuit unit, a second analog circuit unit and a detecting unit. The detecting unit is used to detect whether a first computed result or a second computed result outputted from the first analog circuit unit or the second analog circuit unit involves signals transmitted from another node device in the network, and accordingly generate a detected result to allow the switching unit to execute a switching operation and selectively connect the transmitting unit to the first or second pair of connectors, so as to ensure that data can be transmitted or received reliably in the network.

11 Claims, 3 Drawing Sheets

AUTOMATIC CONFIGURATION SYSTEM

CROSS-REFERENCE TO RELATED APPLICATIONS

This application claims benefit under 35 USC 119 of Taiwan Application No. 094140759, filed on Nov. 21, 2005.

FIELD OF THE INVENTION

The present invention relates generally to relates to automatic configuration systems, and more particularly, to an automatic configuration system applicable to a communication network with transmitting and receiving functionalities capable of automatically configuring transmitting and receiving pins of a connecting interface of a node device in the communication network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

BACKGROUND OF THE INVENTION

Currently many communication networks with transmitting and receiving functionalities, such as Local Area Network (LAN) etc., employ medium with copper twisted pair to simultaneously transmit/receive data, which requires at least a copper twisted pair for transmitting data and at the same time at least a copper twisted pair for receiving data. Two node devices in a LAN transmit/receive data between each other via a link. For example, in a LAN technique using a full-duplex medium, different copper wires are used for transmitting and receiving data. Thus, twisted pair at the terminal of each link needs to have a corresponding twisted pair. For example, in a star-based network, a Network Interface Card (NIC) is often used as a node device; a switch or repeater is used as a connector. For link to properly operate, the NIC must transmit data over a twisted pair which connects to a receiver such as a network hub or switch. In the meantime, the receiver of the NIC must be connected to the transmitter of the device at the other end of the link. If the twisted pair for transmitting data of a device is connected to the transmitting connector of a connecting device, then the connection of the two devices thereof obviously fails.

The majority of network addresses in a LAN assigns different connector pins to the copper wires in the twisted pairs. The twisted pair is called a Medium Dependent Interface (MDI). In the IEEE 802.3 10Base-T standard, a terminal node assigns pins P1 and P2 for connecting to a twisted pair for transmitting data, and pins P3 and P6 for connecting to a twisted pair for receiving data. For a 10Base-T network, a hub functioning as a repeater or switch assigns its transmitter to connect to pins P3 and P6 and its receiver to connect to pins P1 and P2. In the case of connecting a network interface card to a repeater, such designation is good. However, several problems still exist, which become more prominent for a switching network. When a network interface card is directly connected to another network interface card or a repeater connected to another repeater or a repeater connected to a switch, according to the pin designation of network interface, cross cables are necessary since two local network products have the same pin designation on its interface.

According to the shortcomings of the above prior art, bus switches are developed as cross-typed circuits that use low frequency to automatically switch between pins. However, this kind of product has to following disadvantage: when two devices of this type are connected together, each device may enter a "lock step" operating status, such that none of them can achieve communication linkage. In order to eliminate the phenomenon of "lock step", developed LAN products using a similar algorithm are forced to operate with different switching frequency.

FIG. 1 shows schematic connecting architecture of a conventional 10Base-T Medium Dependent Interface (MDI). As shown, the connecting architecture is applied to a network interface card (NIC) 10 and a hub interface 12. A transmit pair of the NIC 10 is connected to its pins P1 and P2. The pins P1 and P2 of the NIC 10 are connected to pins P1 and P2 of the hub interface 12 via a twisted pair 14. A receive pair of the NIC 10 is connected to its pins P3 and P6. The pins P3 and P6 of the NIC 10 are connected to pins P1 and P2 of the hub interface 12 via a twisted pair 16.

FIG. 2 shows schematic connecting architecture of another conventional network device (e.g. a repeater or switch or hub interface). In this conventional connecting architecture, the network device comprises two connecting hub interfaces (12, 12'), for example, wherein a cross connection is required. Thus, pins P1 and P2 of the transmit pair of the hub interface 12' are connected to pins P3 and P6 of the receive pair of the hub interface 12 via a twisted pair 14; similarly, pins P3 and P6 of the receive pair of the hub interface 12' are connected to pins P1 and P2 of the transmit pair of the hub interface 12 via a twisted pair 16. However, the interfaces of the conventional network device have different designations such that data cannot be received or transmitted from/to the other end.

Therefore, there is a need for an automatic configuration system for automatically configuring a connecting interface of a node device on a network which eliminates the unreliable transmission/reception of data described in the prior art.

SUMMARY OF THE INVENTION

In the light of forgoing drawbacks, an objective of the present invention is to provide an automatic configuration system for automatically configuring a connecting interface of a node device of a network to ensure reliable data transmission and reception between node devices on the network.

Another objective of the present invention is to provide an automatic configuration system for automatically configuring a connecting interface of a node device of a network.

In accordance with the above and other objectives, the present invention provides an automatic configuration system for automatically configuring a plurality of connectors of a node device on a network. The node device comprises a first pair of connectors and a second pair of connectors, where one of the first and second pairs of connectors is used for transmitting signals while the other of the first and second pairs of connectors is used for receiving signals. The network comprises a transmitting unit and a receiving unit, wherein the receiving unit is connected to the first pair of connectors and the second pair of connectors and the transmitting unit is selectively connected to one of the first pair of connectors and the second pair of connectors. The automatic configuration system comprises: a switching unit having a first state and a second state, the switching unit switching between the first state and the second state based on a control signal, wherein when the switching unit is in the first state, the transmitting unit is connected to the first pair of connectors and when the switching unit is in the second state, the transmitting unit is connected to the second pair of connectors; a first and a second analog circuit unit, wherein when the switching unit is in the first state, the first analog circuit unit receives a first signal sent by the transmitting unit and a second signal existing on the first pair of connectors and performs calculation on the first signal and the second signal to obtain a first computed result, when the switching unit is in the second state, the second analog circuit unit receives the first signal sent by the transmitting unit and a third signal existing on the second pair of connectors and performs calculation on the first signal and the third signal to obtain a second computed result; and a detecting unit, when the switching unit being in the first state, the detecting unit detecting whether a signal exists in the first computed result in a predetermined time, if so, then generating said control signal to allow the switching unit to switch from the first state to the second state, so that the transmitting unit is connected to the second pair of connectors, when the switching unit being in the second state, the detecting unit detecting whether a signal exists in the second computed result in a predetermined time, if so, then generating said control signal to allow the switching unit to switch from the second state to the first state, so that the transmitting unit is connected to the first pair of connectors.

The first computed result is obtained by subtracting the first signal from the second signal, wherein another node device connected to the node device on the network transmits a fourth signal, the preset second signal being the sum of the first signal and the fourth signal.

The second computed result is obtained by subtracting the first signal from the third signal, wherein another node device connected to the node device on the network transmits a fourth signal, the preset third signal being the sum of the first signal and the fourth signal.

When the switching unit is in the first state, the detecting unit detects whether a fourth signal exists in the first computed result, if so, then the switching unit performs switching to allow the transmitting unit to switch connection from the first pair of connectors to the second pair of connectors. When the switching unit is in the second state, the detecting unit detects whether a fourth signal exists in the second computed result, if so, then the switching unit performs switching to allow the transmitting unit to switch connection from the second pair of connectors to the first pair of connectors.

Additionally, if the detecting unit does not detect the fourth signal in the first computed result or the second computed result in the predetermined time, then it indicates that the first pair of connectors and the second pair of connectors are properly configured, so the switching unit need not perform any switching operation.

The first and second analog circuit units are formed in a hybrid chip. The node device is one of a Network Card Interface (NIC), a switch, a repeater and a hub.

Compared to the prior art, the automatic configuration system of the present invention is capable of detecting whether the fourth signal sent by another node device on the network exists in the first computed result or the second computed result, and controlling the status switching operations of the switching unit based on the detected result, such that the transmitting unit can be selectively connected to the first pair of connectors or the second pair of connectors. As a consequence, network communication can be established between the node device and another node device on the network for reliable transmitting and receiving of data.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
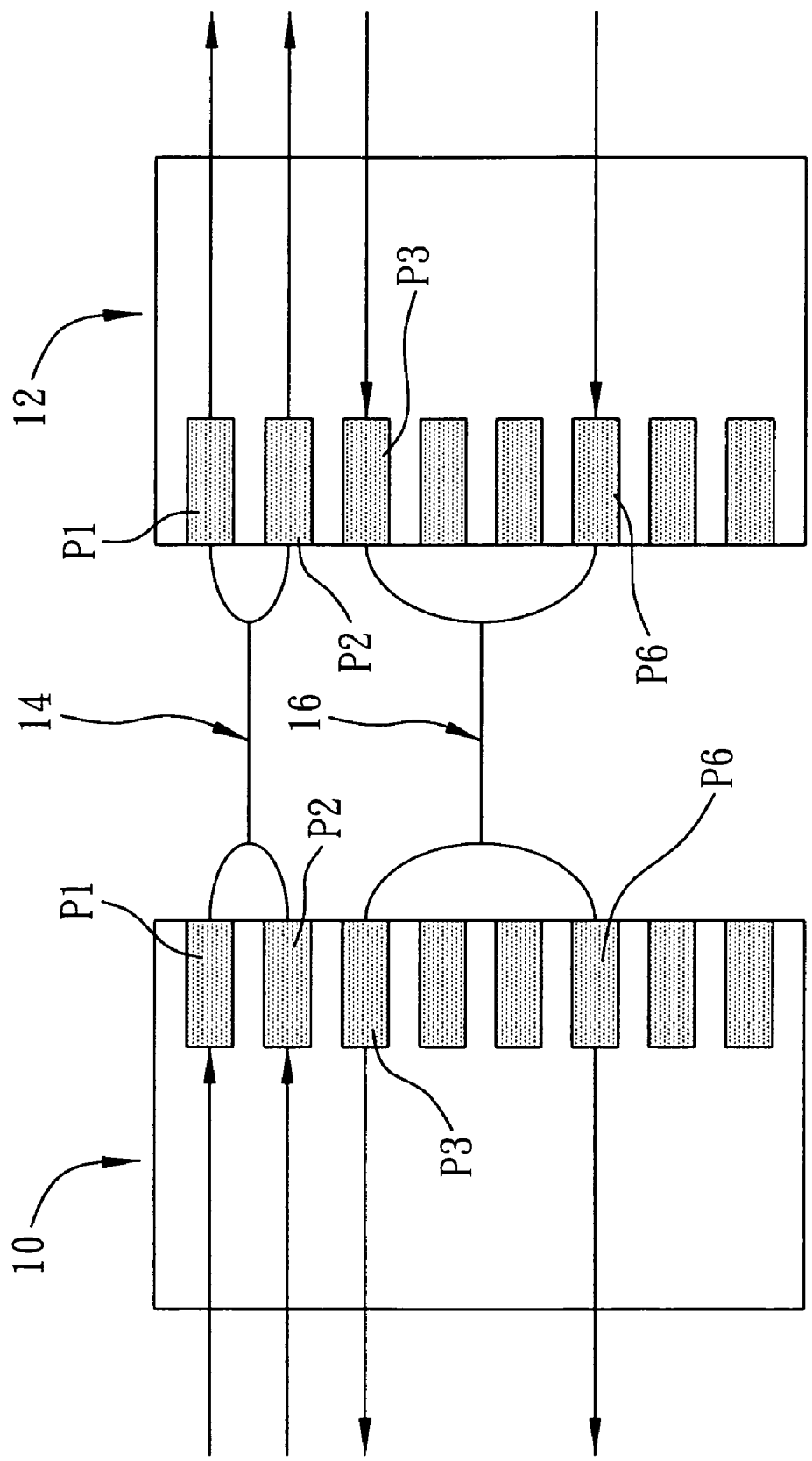
FIG. 1 (Prior Art) is a schematic diagram of a conventional 10Base-T Medium Dependent Interface.
Figure 2:
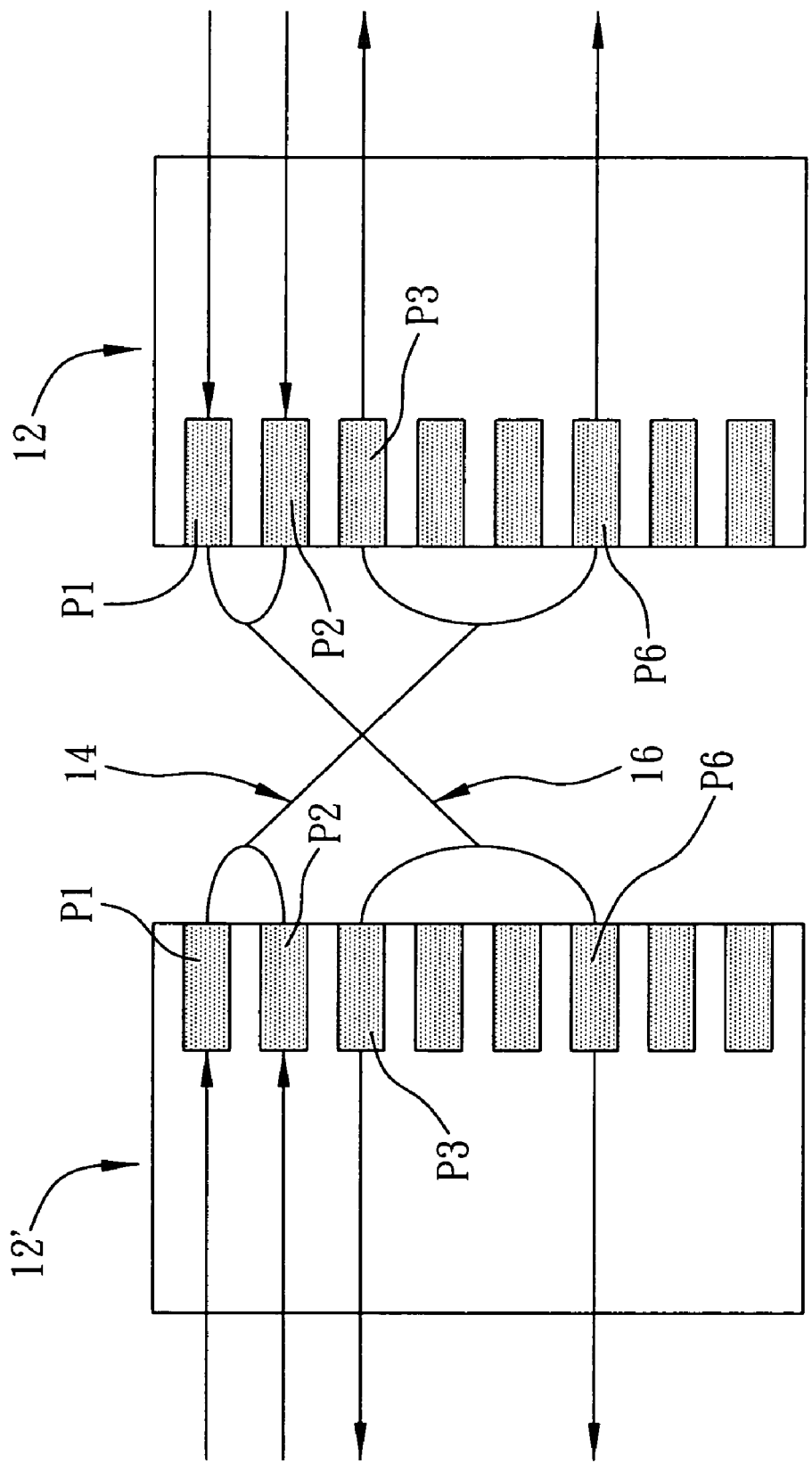
FIG. 2 (Prior Art) is another schematic diagram showing connection between conventional repeater, switch or hub and a similar repeater, switch or hub.
Figure 3:
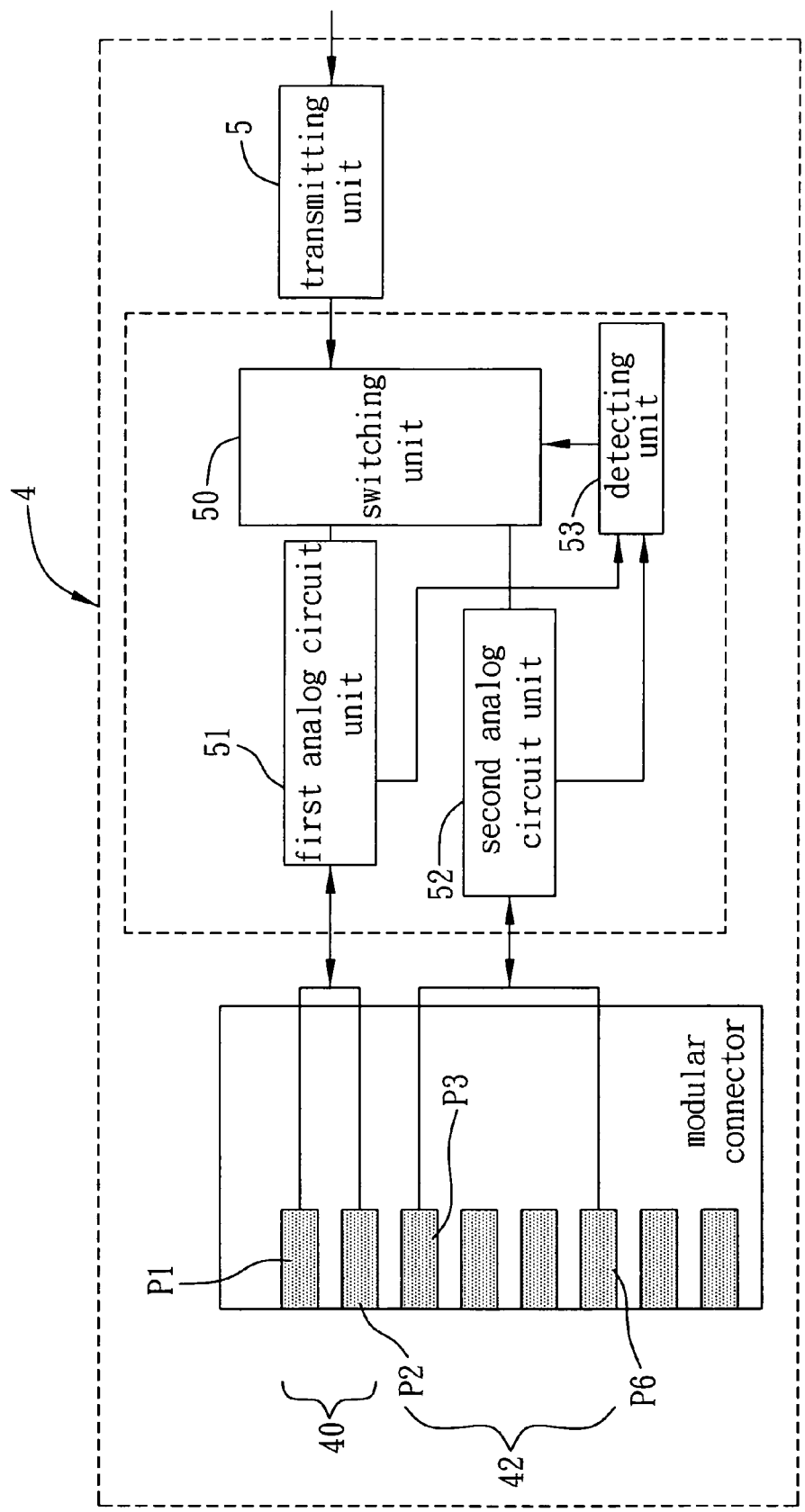
FIG. 3 is a block diagram of basic structure of the automatic configuration system of the present invention.

Please refer to FIG. 3, which shows a basic structure of the automatic configuration system of the present invention. It should be noted that the drawing is only a simplified schematic for illustrating those elements related to the present invention. Thus, the elements shown may not be exactly in accordance with actual implementations.

As shown in FIG. 3, the automatic configuration system of the present invention is applied to a communication network with transmitting and receiving functionalities. The automatic configuration system can automatically configure a connecting interface of a network connector in the communication network as a receiving end or a transmitting end. The connecting interface is for example a 10Base-T, 100Base-T or 1000Base-T Medium Dependent Interface (MDI) of a node device 4 on a Local Area Network (LAN). The node device 4 is for example a Network Interface Card (NIC), a switch, a repeater or a hub. In order to simplify illustration, the following embodiment regards the node device 4 as a NIC, but the present invention is not limited to this. As shown, the NIC 4 comprises a modular connecter (RJ-45) having a connecting interface consisting of a plurality of pins (P1, P2, P3, P6 etc.), wherein the contact pins P1 and P2 together function as a first pair of connectors 40, and the contact pins P3 and P6 together function as a second pair of connectors 42. The first pair of connectors 40 or the second pair of connectors 42 is used for transmitting data, while the other pair is used for receiving data. The automatic configuring system of the present invention can selectively connect to the first pair of connectors 40 or the second pair of connectors 42. The receiving unit can be simultaneously connected to the first pair of connectors 40 and the second pair of connectors 42.

As shown in FIG. 3, the automatic configuration system of the present invention (enclosed by the dashed line) comprises a switching unit 50, a first analog circuit unit 51, a second analog circuit unit 52 and a detecting unit 53.

The switching unit 50 performs switching based on a control signal so as to selectively switch a transmitting unit 5 to a first pair of connectors 40 or a second pair of connectors 42.

In this embodiment, the switching unit 50 has a first state and a second state. When the switching unit 50 is in the first state, the transmitting unit 5 is connected to the first pair of connectors 40; when the switching unit 50 is in the second state, the transmitting unit 5 is connected to the second pair of connectors 42. It should be noted that the switching unit 50 of the present invention may be a multiplexer. The working principle of a multiplexer is well known in the art, so it will not be further described. The above multiplexer can be replaced by other electronic components or electrical circuits having similar functionality depending on actual design needs.

The first analog circuit unit 51 is electrically connected to the first pair of connectors 40, the switching unit 50 and the detecting unit 53. The second analog circuit unit 52 is electrically connected to the first pair of connectors 40, the switching unit 50 and the detecting unit 53. In this embodiment, when the switching unit 50 is in the first state (i.e. the transmitting unit is connected to the first pair of connectors 40, which is used for transmitting signals), the first analog circuit unit 51 receives a first signal sent by the transmitting unit and a second signal on the first pair of connectors 40, and performs calculation on the first signal and the second signal to generate a first computed result. The first computed result is calculated using equation (1) below:

(first computed result)=(second signal)−(first signal) equation (1)

wherein the preset second signal=first signal+fourth signal, the fourth signal is a signal sent by another node device on the network to the NIC 4.

When the switching unit 50 is in the second state (i.e. the transmitting unit is connected to the second pair of connectors 42, which is used for transmitting signals), the second analog circuit unit 52 receives a first signal sent by the transmitting unit and a third signal on the second pair of connectors 42, and performs calculation on the first signal and the third signal to generate a second computed result. The second computed result is calculated using equation (2) below:

(second computed result)=(third signal)−(first signal) equation (2)

wherein the preset third signal=first signal+fourth signal, the fourth signal is a signal sent by another node device on the network to the NIC 4.

The first analog circuit 51 and the second analog circuit 52 are formed in a hybrid chip. It should be noted that the working principle of a hybrid chip is well known in this art, and is not the feature of the present invention, thus will not be described in detail. Further, the hybrid chip can be replaced with electronic components or electric circuits with similar functionality depending on actual design needs.

The detecting unit 53 is used to detect whether there is signal in the first computed result generated by the first analog circuit unit 51 or the second computed result generated by the second analog circuit unit 52 in a predetermined time, and generate a control signal based on the detected result to control the switching action of the switching unit 50, so as to selectively connect the transmitting unit 5 to the first pair of connectors 50 or the second pair of connectors 42. In this embodiment, when the switching unit 50 is in the first state, the detecting unit 53 detects whether there the fourth signal is in the first computed result in a predetermined time, if so, it means that the first pair of connectors 40 has wrong designation. Upon which, the detecting unit 53 generates a control signal output based on the detected result, which is provided to the switching unit 50. Based on this control signal, the switching unit 50 performs switching to allow the transmitting unit 5 to switch connection from the first pair of connectors 40 to the second pair of connectors 42, so that signals are transmitted via the second pair of connectors 42 while signals are received via the first pair of connectors 40. If fourth signal does not exist in the first computed result, it indicates that the designation of the first pair of connectors 40 is correct. At the same time, based on the detected result, the detecting unit 50 allows the switching unit 50 to maintain its current state (i.e. no switching is performed). In such a state, the first pair of connectors 40 is used for transmitting signals and the second pair of connectors 42 is used for receiving signals.

When the switching unit 50 is in the second state, the detecting unit 53 detects whether there the fourth signal is in the second computed result in a predetermined time, if so, it means that the second pair of connectors 42 has wrong designation. Upon which, the detecting unit 53 generates a control signal output based on the detected result, which is provided to the switching unit 50. Based on this control signal, the switching unit 50 performs switching to allow the transmitting unit 5 to switch connection from the second pair of connectors 42 to the first pair of connectors 42, so that signals are transmitted via the first pair of connectors 40 while signals are received via the second pair of connectors 42. If fourth signal does not exist in the second computed result, it indicates that the designation of the second pair of connectors 42 is correct. At the same time, based on the detected result, the detecting unit 50 allows the switching unit 50 to maintain its current state (i.e. no switching is performed). In such a state, the first pair of connectors 40 is used for receiving signals and the second pair of connectors 42 is used for transmitting signals. The above predetermined time is set by the user in advance according to actual design needs.

Thus, the automatic configuration system of the present invention is capable of determining (detecting) whether the fourth signal sent by another node device on the network exists in the first computed result or the second computed result, and controlling the status switching actions of the switching unit based on the detected result, such that the transmitting unit can be selectively connected to the first pair of connectors or the second pair of connectors. As a consequence, network communication is established between the node device and another node device on the network for reliable transmitting and receiving of data.

Furthermore, in the present invention, prior to establish network connection between the node device and another node device, only the transmitting unit is required to have power for driving the transmitting unit to transmit signal, and configuration between the first pair of connectors or the second pair of connectors and the transmitting unit is accomplished through the automatic configuration system of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An automatic configuration system for automatically configuring a connecting interface of a node device on a network, the connecting interface of the node device comprising a first pair of connectors and a second pair of connectors, one of the first and second pairs of connectors being for transmitting signals and the other of the first and second pairs of connectors being for receiving signals, and the network comprising a transmitting unit and a receiving unit, the receiving unit being connected to the first pair of connectors and the second pair of connectors and the transmitting unit being selectively connected to one of the first and second pairs of connectors, the automatic configuration system comprising:

- a switching unit having a first state and a second state, the switching unit switching between the first state and the second state based on a control signal, wherein when the switching unit is in the first state, the transmitting unit is connected to the first pair of connectors, and when the switching unit is in the second state, the transmitting unit is connected to the second pair of connectors;
- a first analog circuit unit and a second analog circuit unit, wherein when the switching unit is in the first state, the first analog circuit unit is configured to receive a first signal sent by the transmitting unit and a second signal existing on the first pair of connectors and perform calculation on the first signal and the second signal to obtain a first computed result, or when the switching unit is in the second state, the second analog circuit unit is configured to receive the first signal sent by the transmitting unit and a third signal existing on the second pair of connectors and perform calculation on the first signal and the third signal to obtain a second computed result; and
- a detecting unit for detecting whether a signal exists in the first computed result in a predetermined time when the switching unit is in the first state, and if so, for generating the control signal to allow the switching unit to switch from the first state to the second state such that the transmitting unit is connected to the second pair of connectors; or when the switching unit is in the second state, the detecting unit for detecting whether a signal exists in the second computed result in a predetermined time, and if so, for generating the control signal to allow the switching unit to switch from the second state to the first state such that the transmitting unit is connected to the first pair of connectors.

2. The automatic configuration system of claim 1, wherein the first and second analog circuit units are formed in a hybrid chip.

3. The automatic configuration system of claim 1, wherein the first computed result is obtained by subtracting the first signal from the second signal.

4. The automatic configuration system of claim 3, wherein another node device connected to the node device on the network transmits a fourth signal, and the second signal is the sum of the first signal and the fourth signal.

5. The automatic configuration system of claim 4, wherein when the switching unit is in the first state, the detecting unit is configured to detect whether the fourth signal exists in the first computed result, and if so, allow the switching unit to switch the state thereof so as to switch connection of the transmitting unit from the first pair of connectors to the second pair of connectors.

6. The automatic configuration system of claim 4, wherein when the switching unit is in the second state, the detecting unit is configured to detect whether the fourth signal exists in the second computed result, and if so, allow the switching unit to switch the state thereof so as to switch connection of the transmitting unit from the second pair of connectors to the first pair of connectors.

7. The automatic configuration system of claim 1, wherein the second computed result is obtained by subtracting the first signal from the third signal.

8. The automatic configuration system of claim 7, wherein another node device connected to the node device on the network transmits a fourth signal, and the third signal is the sum of the first signal and the fourth signal.

9. The automatic configuration system of claim 8, wherein when the switching unit is in the first state, the detecting unit is configured to detect whether the fourth signal exists in the first computed result, and if so, allow the switching unit to switch the state thereof so as to switch connection of the transmitting unit from the first pair of connectors to the second pair of connectors.

10. The automatic configuration system of claim 8, wherein when the switching unit is in the second state, the detecting unit is configured to detect whether the fourth signal exists in the second computed result, and if so, allow the switching unit to switch the state thereof so as to switch connection of the transmitting unit from the second pair of connectors to the first pair of connectors.

11. The automatic configuration system of claim 1, wherein the node device is one of a Network Interface Card (NIC), a switch, a repeater and a hub.

* * * * *